US010269205B2

(12) United States Patent
McFarland

(10) Patent No.: US 10,269,205 B2
(45) Date of Patent: Apr. 23, 2019

(54) SYSTEM FOR SECURE STORAGE OF AND CONTROLLED ACCESS TO ARTICLES AND APPARATUS THEREFOR

(71) Applicant: Smart Tools (UK) Ltd., Chelmsford, Essex (GB)

(72) Inventor: John McFarland, Rugby (GB)

(73) Assignee: Smart Tools (UK) Ltd., Essex (GB)

( * ) Notice: Subject to any disclaimer, the term of this patent is extended or adjusted under 35 U.S.C. 154(b) by 111 days.

(21) Appl. No.: 15/123,733

(22) PCT Filed: Mar. 6, 2015

(86) PCT No.: PCT/EP2015/054727
§ 371 (c)(1),
(2) Date: Sep. 6, 2016

(87) PCT Pub. No.: WO2015/132385
PCT Pub. Date: Sep. 11, 2015

(65) Prior Publication Data
US 2017/0018136 A1   Jan. 19, 2017

(30) Foreign Application Priority Data

Mar. 6, 2014   (GB) .................................. 1403986.1

(51) Int. Cl.
*G07F 11/62* (2006.01)
*G07F 11/00* (2006.01)
*G07F 11/18* (2006.01)
*G07F 5/26* (2006.01)
*G05B 15/02* (2006.01)

(52) U.S. Cl.
CPC .............. *G07F 11/62* (2013.01); *G05B 15/02* (2013.01); *G07F 5/26* (2013.01); *G07F 11/005* (2013.01); *G07F 11/18* (2013.01)

(58) Field of Classification Search
CPC ......................................................... G07F 5/26
USPC ....................................................... 700/231
See application file for complete search history.

(56) References Cited

U.S. PATENT DOCUMENTS

| 5,392,951 A | 2/1995 | Gardner et al. |
| 5,927,540 A * | 7/1999 | Godlewski .......... G07F 17/0092 221/103 |
| 6,109,774 A | 8/2000 | Holmes et al. |
| 8,701,931 B2 * | 4/2014 | Santmyer ................ G07F 17/14 221/1 |
| 2007/0283733 A1 * | 12/2007 | Ratkus ................ E05B 47/0012 70/78 |
| 2010/0106291 A1 * | 4/2010 | Campbell ........... E05B 47/0002 700/231 |

(Continued)

OTHER PUBLICATIONS

International Search Report, PCT/EP2015/054727 (dated 2015).

*Primary Examiner* — Timothy R Waggoner
(74) *Attorney, Agent, or Firm* — Walters & Wasylyna LLC

(57) ABSTRACT

A drawer control means for controlling access to restricted stored items located in compartments in drawers positioned within a cabinet housing a multiplicity of drawers, said drawers being arranged in columns, whereby the drawers in any column can be controlled such that access to a selected drawer and access to a specified compartment within that drawer is effected by only two locking mechanisms per drawer column, and such that the withdrawal distance of a drawer from the cabinet is pre-set prior to the drawer being opened.

13 Claims, 14 Drawing Sheets

(56) References Cited

U.S. PATENT DOCUMENTS

| | | | |
|---|---|---|---|
| 2010/0123375 A1* | 5/2010 | Romaen | E05B 65/462 312/215 |
| 2011/0127286 A1* | 6/2011 | Tabata | G07D 1/02 221/8 |
| 2012/0004764 A1* | 1/2012 | Rahilly | G06F 19/3462 700/225 |
| 2012/0235550 A1* | 9/2012 | Santmyer | G07F 11/62 312/334.44 |
| 2013/0069498 A1* | 3/2013 | Morgan | G07F 11/62 312/107 |

* cited by examiner

SYSTEM FOR SECURE STORAGE OF AND CONTROLLED ACCESS TO ARTICLES AND APPARATUS THEREFOR

This application is a U.S. national phase application of Intl. App. No. PCT/EP2015/054727 filed on Mar. 6, 2015, which claims priority from GB1403986.1 filed on Mar. 6, 2014. The entire contents of PCT/EP2015/054727 and GB1403986.1 are incorporated herein by reference.

FIELD OF THE INVENTION

The present invention relates to a dispensing system and an apparatus for vending or dispensing articles. More particularly, but not exclusively, the invention relates to a dispensing system for storing high value items that utilises controlled access to such items by locating items in restricted access compartments. The invention finds advantageous application in a wide variety of supply chain applications, for example as a point of sale unit where a consumer directly purchases items, or as an inventory control and storage system for use in a factory or large office housing, for example, tools and components or stationary and office supplies.

Aspects of the invention relate to a system for controlled dispensing, to an apparatus, and to a method.

BACKGROUND OF THE INVENTION

Industrial vending machines are known. There are a number of different designs. The majority generally utilise a variety of converted drinks and confectionary machines. Such machines have a number of limitations; most notably that stored items usually require repackaging and/or are dropped from a height into a receiving tray, which is inappropriate for high value precision goods or delicate items.

There exists a small number of application-specific machines that have been designed to directly address the needs associated with the controlled dispensing of high value goods. Such machines generally comprise a plurality of drawers, each containing a plurality of compartments, each compartment containing a stored item. In one such known machine, each individual compartment can be opened by the release of a lid on that compartment. The release is effected by means of a solenoid-operated latch. In an alternative design, a drawer is allowed to be pulled out to a prescribed distance from the body of its cabinet such that a specific compartment in the drawer may be accessed, the withdrawal distance being defined by a computer, at which point it is locked such that further withdrawal is prevented, thereby allowing access to a specified compartment within the drawer. Again, the locking and release of the drawer is controlled by means of a solenoid-operated latching mechanism.

These designs all have a common feature in that each drawer or compartment requires a release/locking mechanism, comprising a solenoid and sensor system for open/close sensing and distance measurement. A significant number of these mechanisms is required in each machine; almost a 1:1 ratio of compartments and mechanisms is required. In order to provide a machine with adequate capacity for secure storage of individual items for it to be useful, such machines typically comprise in the region of eighty solenoid mechanisms.

Furthermore, such solenoid sensor mechanisms require the solenoid locking mechanism only to be actuated once the sensor means indicates to the control system that the drawer has been withdrawn from the cabinet to the required distance. Disadvantageously, such systems can fail because it can be possible to pull a drawer out more quickly than the latching mechanism can lock it, due to the inherent inertia in the solenoid mechanism and electrical delays. It is therefore possible to defeat the locking mechanism, leading to unauthorised access to restricted compartments.

Such systems thus require many components, which are expensive and bulky and such systems are not always secure.

It is desirable to provide a secure dispensing system in which the number and complexity of the locking parts is reduced. It is desirable to overcome problems associated with being able to defeat the locking mechanisms of the prior art by rapid withdrawal of the drawer.

The present invention seeks to provide an improvement in the field of dispensing systems for storage and controlled access of articles that has particular application for high value articles such as tools, computer and electrical components, parts in automotive manufacture and the like. The present invention provides a mechanical arrangement for locking and releasing drawers and controlling access to individual drawer compartments, and provides a mechanism for pre-selecting the withdrawal distance prior to releasing the selected drawer.

The invention may be utilised in applications other than for high value articles. For example, it is foreseen that the invention may have application in warehouses, offices, shopping malls and on construction sites and the like, where there is a benefit to providing on-location secure storage and controlled access of articles.

SUMMARY

According to a first aspect of the invention, there is provided a controlled access dispensing system comprising: a controller, a cabinet, a first drawer column comprising one or more drawers, housed within said cabinet, and a locking arrangement for said first drawer column, the locking arrangement being coupled to said controller and comprising first and second co-operative locking mechanisms operable by the controller means to selectively allow a drawer from the first drawer column to be released and withdrawn only to a pre-determined extent, said first and second locking mechanisms being operated in turn, one after the other, so that first locking mechanism, responsible for limiting the extent to which a drawer is withdrawn, is correctly positioned, and then subsequently the second locking mechanism, responsible for releasing the selected drawer, is operated and thereby when a drawer is selected for release and the locking arrangement operated, the first locking mechanism is first positioned to prevent withdrawal of that selected drawer beyond the pre-determined limit, before that selected drawer is released for withdrawal, wherein the first locking mechanism responsible for limiting the extent to which a drawer is withdrawn comprises: a first latching part comprising a laterally arranged sequence of formations provided on a side of each drawer in the drawer column; and a first locking part, shaped and configured for co-operating with said first latching part; and wherein the second locking mechanism responsible for releasing a selected drawer comprises: a second latching part comprising a longitudinally arranged series of formations provided on a side of each drawer in the first drawer column; and a second locking part shaped and configured for co-operating with said second latching part; the first locking part being moveable such that in dependence upon a position of the first locking part relative to the first latching part a drawer selected for release may be withdrawn out of the cabinet only to a pre-determined extent; and the second locking part being moveable such that in dependence upon a position of the second locking part relative to a position of the second latching part, a drawer from said first drawer column may be released for withdrawal from the cabinet to said pre-determined extent.

Optionally, said locking arrangement is housed entirely internally within the cabinet and is thereby shielded from external interference.

Optionally, the first locking part comprises a first locking bar, wherein the first locking bar is coupled to a first drive means which is arranged for raising and lowering the first locking bar wherein the second locking part comprises a second locking bar, wherein the second locking bar is coupled to a second drive means which is arranged for raising and lowering the second locking bar.

Optionally, the first locking bar comprises a sequence of longitudinally arranged projections and the second locking bar comprises a sequence of longitudinally arranged notches.

Optionally, the formations of the laterally arranged sequences of formations of the first latching part provided on the side of each drawer comprise projections, detents, pins, step risers or protruding abutments.

Optionally, the formations of the laterally arranged sequences of formations provided on the side of each drawer in the drawer column are arranged in an inclined manner.

Optionally, each drawer comprises two or more compartments and wherein the number of formations in each sequence correlates to the number of compartments per drawer and wherein the formations in each sequence are positioned in correspondence with the compartments.

Optionally, the second locking bar is disposed in front of the first locking bar, and wherein the second locking bar has a series of notches formed therein, the notches in the series being spaced such that incremental or step-wise adjustment of the position of the second locking bar releases one drawer singly and sequentially on each increment.

Optionally, the formations of the longitudinally arranged sequence of formations of the second latching part are each projections, detents or pins and the second locking bar is moveable to align a projection, pin or detent such that it can pass through a notch of said sequence of notches in the second locking bar to release a drawer.

Optionally, the first locking bar is accommodated within a first guide channel disposed internally of and formed within the cabinet and wherein the second locking bar is accommodated within a second guide channel disposed internally of and formed within the cabinet.

Optionally, the first and second locking bars and said first and second guide channels are parallel to one another.

Optionally, the second and first locking bars are individually moveable in a vertical plane and are engageable with an array of detent pins located on the side of each drawer, such that movement of the second locking bar will release one selected drawer for withdrawal and will prevent withdrawal of any other drawers in said drawer column and movement of the first locking bar before said second locking bar determines the extent to which withdrawal of that released drawer is permitted before the drawer is released for withdrawal by movement of said second locking bar.

Optionally, the first locking bar is a rear locking bar and has a series of dogs on the profile of its inner edge that engage with a sequence of detent pins on the side of the drawer such that incremental vertical movement of the first locking bar positions said dogs such that they engage with the said detent pins at different positions, and such that these positions effect control of the distance of withdrawal of the drawer from its cabinet.

Preferably, a multiplicity of detent pins are located within the drawer side, pitched laterally in increments corresponding to each drawer's internal compartment, and in ascending pitches vertically in increments corresponding to each incremental or step-wise movement of the first locking bar.

According to another aspect of the invention, there is provided a locking arrangement for a controlled access dispensing system comprising a cabinet having at least a first drawer column comprising one or more drawers, the locking arrangement comprising a first two-part locking mechanism and a second two-part locking mechanism, the first two-part locking mechanism comprising a first moveable locking part disposed adjacent to the first drawer column and a first latching part provided on the drawers; the second two-part locking mechanism comprising a second moveable locking part disposed adjacent the first drawer column and a second latching part provided on the drawers, the first moveable locking part being movable to pre-determine a limit to which a drawer can be withdrawn before the second moveable locking part is moved to release a selected drawer for withdrawal and thereby when a drawer is selected for release and the locking arrangement operated, the first locking mechanism is first positioned to prevent withdrawal of that selected drawer beyond the pre-determined limit before that selected drawer is released for withdrawal.

According to yet another aspect of the invention there is provided a locking arrangement for a controlled access dispensing system comprising drawers having compartments, the locking arrangement comprising a first, two-part complementary locking mechanism and a second, two-part complementary locking mechanism, the first two-part complementary locking mechanism comprising: a first latching part comprising laterally arranged sequences of formations; and a first locking part, shaped and configured for co-operating with said first latching part and being moveable relative to said first latching part; and wherein the second locking mechanism comprises: a second latching part comprising a series of formations; and a second locking part shaped and configured for co-operating with said second latching part and being moveable relative to said second latching part; the first locking mechanism being operable before the second locking mechanism and being arranged such that the first locking mechanism pre-sets which compartment can be accessed.

It will be seen from the following description that the present invention provides a stored item dispensing machine in which access to stored items, located in a plurality of compartments within a plurality of drawers, is controlled by means of parallel notched and profiled locking bars located adjacent to each column of drawers that are guided and shielded from external interference. Each locking bar is individually driven in a vertical plane by a drive means, such as a motor, and engages one of an array of detent pins located on the side of each drawer, such that movement of one bar will release one selected drawer for withdrawal, the other drawers remaining locked, and movement of the other bar determines the distance of withdrawal of that drawer before the drawer is released.

Optionally, the front locking bar has a series of notches in the profile of the inner edge that engage with an elongated detent pin on the drawer side, the notches being pitched such that incremental movement of the bar releases each drawer singly and sequentially on each increment.

Optionally, the rear locking bar has a series of projections or dogs on the profile of its inner edge that engage with a sequence of detent pins on the side of the drawer such that incremental vertical movement of the locking bar positions said dogs such that they engage with the said detent pins at different positions, and such that these positions effect control of the distance of withdrawal of the drawer from its cabinet.

Optionally, a multiplicity of detent pins are located within the drawer's side, pitched longitudinally in increments corresponding to each drawer's internal compartment, and in ascending pitches vertically in increments corresponding to each incremental movement on the locking bar.

Optionally, simultaneous release of all the drawers for restocking is effected by raising the drawer locking bar to a common notch point.

Optionally, any drawer can be released and removed completely from the machine without the need for disconnecting electrical cabling.

According to yet and even further aspect of the invention, there is provided, a drawer for use in a controlled access dispensing system, the drawer comprising first and second sides, a bottom, a rear-end and a front-end, and:
 a portion of said first latching part, comprising a laterally arranged sequence of formations on a side of the drawer; and
 a portion of said second latching part on a side of the drawer comprising one of a longitudinally arranged series of formations.

Optionally, the controlled access dispensing system comprising the first locking mechanism includes said portion of the first locking part and the first latching part; and the second locking mechanism includes the second locking part and said portion of the second latching part and wherein the portion of the first locking part of the first locking mechanism is moveable such that in dependence upon a position of that portion of the first locking part relative to the first latching part the drawer may be withdrawn out of the cabinet only to a pre-determined extent; and the second locking part is moveable such that in dependence upon a position of the second locking part relative to a position of said portion of the second latching part, the drawer may be released for withdrawal from the cabinet to said pre-determined extent.

Optionally, the formations of the laterally arranged sequence of formations of said portion of the first latching part provided on the side of the drawer comprise projections, detents, pins, step risers or protruding abutments.

Optionally, the formations of the laterally arranged sequence of formations provided on the side of the drawer are arranged in an inclined manner.

Optionally, the drawer comprises two or more compartments and wherein the number of formations in the laterally arranged sequence of formations correlates to the number of compartments in the drawer and wherein the formations of the laterally arranged sequence are positioned in correspondence with the compartments.

Optionally, said one formation of the longitudinally arranged sequence of formations of the second latching part is formed from one or more of: a projection, detent and pin.

Optionally, the drawer is fully removable out of the cabinet of the controlled access dispensing system.

Optionally, no electrical wires connect the drawer to the cabinet such that the drawer is fully removable out of the cabinet of the controlled access dispensing system without detaching any electrical wire connections.

According to another aspect of the invention, there is provided a controlled access dispensing machine wherein drawers are arranged in a grid of columns and rows, the drawers in each column being controlled by an arrangement of two, parallel, profiled locking bars positioned at the side of each column of drawers and located within the body of a profiled column. The locking bars are moved vertically to a number of positions, the motion being effected by, typically, a motor controlled by a computer. The front locking bar controls which drawer may be released from the cabinet and the rear locking bar controls the distance that a drawer may be withdrawn from the cabinet. Thus, in a controlled access drawer system, the invention requires only two locking mechanisms in order to effect the restricted access to a considerable number of items for example, 100 stored items (ten items in ten compartments of ten drawers).

Advantageously, the reduced number of locking mechanisms significantly reduces manufacturing cost, reduces machine size, and improves the reliability of dispensing systems. The invention overcomes problems of defeating the locking means by too rapid withdrawal of the drawer by pre-selecting the withdrawal distance of a selected drawer prior to releasing that drawer. The invention simplifies restocking of the drawers, and drawer removal from the cabinet, for re-configuration of the drawer array with different sized drawers, by enabling simultaneous release of all drawers via driving of a single locking bar to a common release position through software control.

Within the scope of this application it is expressly intended that the various aspects, embodiments, examples and alternatives set out in the preceding paragraphs and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Detailed descriptions of specific embodiments of the dispensing systems, cabinets, drawers, drawer components and methods of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the dispensing systems, cabinets, drawers, drawer components and methods described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
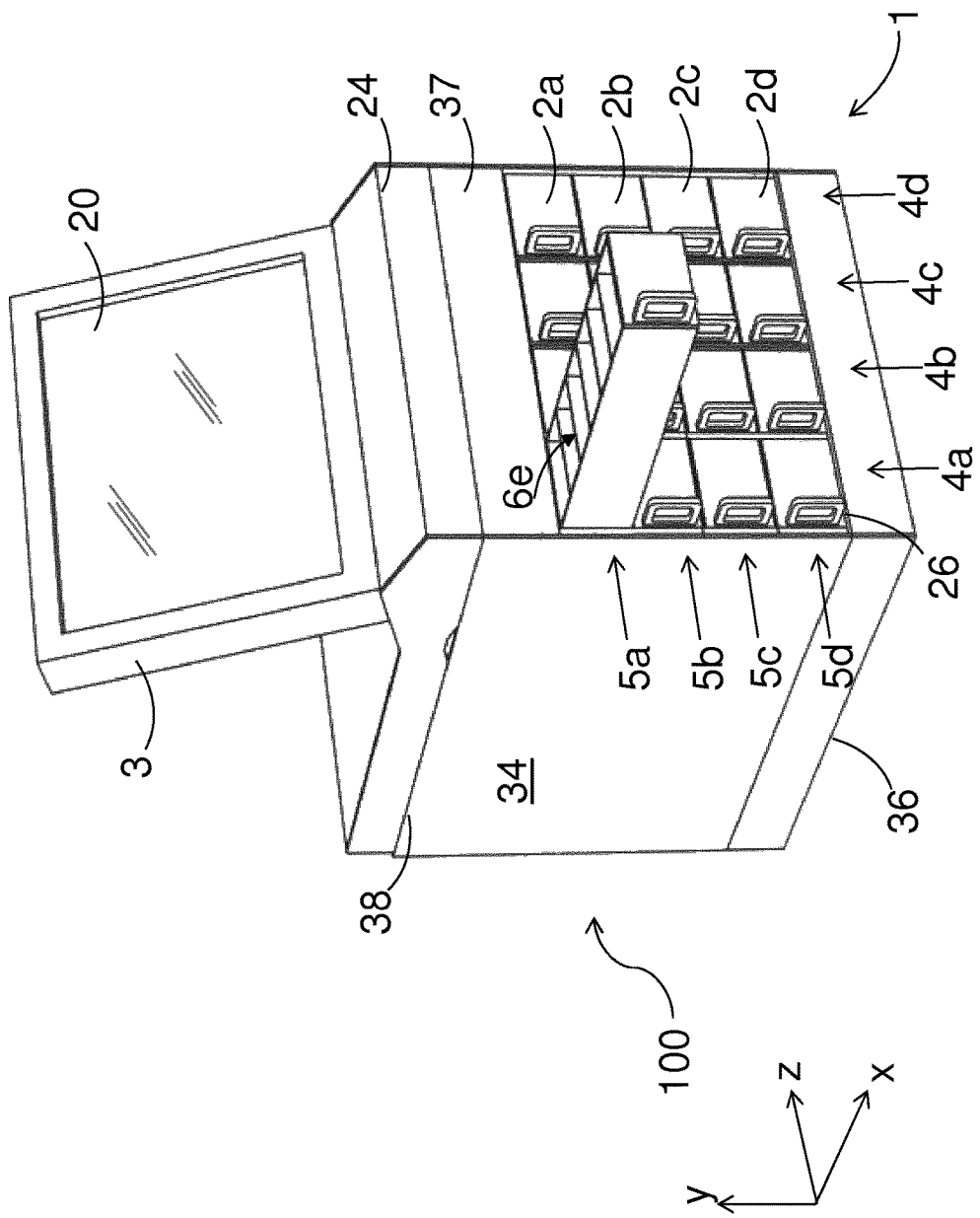
FIG. 1 is a perspective view of a dispensing system, comprising a cabinet housing drawers that are lockable therein and coupled to an access control management unit arrangement according to the present invention. The system is shown with one drawer released and partially withdrawn.

A first exemplary and non-limiting embodiment of a dispensing system 100 according to the disclosure is shown in FIG. 1. The dispensing system 100 comprises a cabinet 1 which provides a housing for accommodating a plurality of drawers 2. The cabinet 1 may also be referred to as a module 1 and, in the presently illustrated embodiment of the disclosure, comprises a top unit 24 mounted to the top of the cabinet 1. In other envisaged embodiments, the top unit 24 may be partially or fully integrated within the structure of the cabinet 1.

The cabinet 1 may be structured and configured to facilitate the mounting of one cabinet 1 on top of another, similar, cabinet 1 in order to form a dispensing system of greater capacity and/or different dimension to that shown in FIG. 1. As such, the illustrated cabinet 1 of FIG. 1 has a size, capacity and configuration that is exemplary and non-limiting.

The cabinet 1 comprises a top section 38, a second side section 34, a bottom section 36, a first side section (not visible in FIG. 1), a rear section (not visible in FIG. 1) and a front section 37 having an opening through which drawers 2 are slidably insertable. As shown, the cabinet 1 is generally cubic in structure, though in other envisaged arrangements, cabinets 1 according to the disclosure may be dimensioned differently to that illustrated.

Preferably the cabinet 1 is formed from metal, for example aluminium, or steel. The cabinet 1 provides for the secure housing of a plurality of drawers 2 which may comprise high value items. As such, the structure of the cabinet 1 is robust and sufficiently strong to prohibit or mitigate against unauthorised entry being gained by breaking through the side, top, front or bottom sections 34, 38, 37, 36 of the structure of the cabinet 1. It will be appreciated that other suitable materials, combinations of materials and/or composite materials may be used for forming the general structure of the cabinet 1.

The open front section of the cabinet 1 is closed by a plurality of drawers 2a-2e. Preferably, at least a drawer front of each drawer 2a-2e is also formed from a sufficiently strong and robust material, for example aluminium or steel, to prohibit or mitigate against unauthorised entry being gained by breaking through the drawer front.

Each drawer 2a-2e is slidable along a lateral x-axis of the cabinet 1 into and, at least partially, out of the opening in the front section 37 of the cabinet 1. Optionally each drawer 2a-2e of each drawer column 4a-4e comprises a handle 26 or other suitable means 26 to enable a user of the dispensing system 100 to grasp the drawer 2a-2e to withdraw it, at least partially, out of the cabinet 1. The drawers 2a-2e can be stowed completely within the housing provided by the cabinet 1.

Each drawer 2a-2e is optionally sub-divided into a plurality of compartments 6a-6k for storing items. Items securely stored by the cabinet 1 may include, but are not limited to: tools, fixings, electrical components such as microprocessors, computing components and the like, toys and gifts, clothing items, office supplies, pharmaceutical and healthcare supplies such as drugs, tablets and other high-value items, repeat use items and any items where secure storage and/or careful and accurate inventory control is beneficial.

The size and number of the cabinets 1, size and number of drawers 2a-2e and size and number of compartments 6a-6k is determined by the number, arrangement and size of items to be securely stored therein.

In the accompanying illustrations of FIGS. 1 to 10, no items are shown in order to avoid obscuring details of the dispensing system 100, cabinets 1 and drawers 2a-2e. However, it will be appreciated that in use, one or more items can be stored in each compartment 6a-6k or each drawer 2a-2e.

As shown in FIG. 1, the cabinet housing 1 is arranged to hold a plurality of drawers 2a-2e, in an arrangement wherein the drawers 2a-2e are stacked (along a longitudinal y-axis) on top of one another in columns 4a-4e (also referred to as "drawer columns") which are disposed side-by-side in adjacent rows 5a-5d.

The drawers 2a-2e are lockable within the cabinet 1 by one or more locking arrangements 80. In the illustrated arrangement, the cabinet 1 accommodates four drawer columns 4a-4e and therefore the dispensing system 100 shown comprises four locking arrangements 80, one for each drawer column 4a-4e.

The drawers 2a-2e of each drawer column 4a-4e are, optionally independently, releasable by operation of the locking arrangement 80 such that a selected drawer 2a can be released (i.e., unlocked) and slidably withdrawn (at least partially) from the cabinet 1. The locking arrangement 80 allows for both the selective release of one or more drawers 2a-2e, whilst maintaining all other drawers 2a-2e locked in a closed manner within the cabinet 1; and the locking arrangement 80 restricts and controls the extent to which a released drawer 2a may be withdrawn out of the cabinet 1. The release of an individual drawer 2a from a drawer column 4a-4e is controlled and managed by an access control management unit 3.

In the presently described dispensing system 100, the access control management unit 3 (which may also be referred to herein simply as controller means 3) is accommodated within the top unit 24 mounted to the top of the cabinet 1. The controller means 3 optionally takes the form of a computer 3 having a human machine interface (HMI) 20 such as a touch-responsive screen 20 associated therewith.

Data relating to the identity and to the location (address) of each item that is stored within the cabinet 1 of the dispensing system 100 is held in a memory associated with the controller means 3. The data relating to the identity of an item may comprise a description of the item, a product code, a product name and/or other information. The data relating to the address of an item within the cabinet may comprise an identifier for the cabinet (in the present arrangement only one cabinet 1 is shown, but in other envisaged embodiments where the dispensing system 100 comprises more than one cabinet in a stacked column managed by a single access management means 3, the data may comprise an identifier for the cabinet); an identifier for the drawer column; an identifier for the drawer; and an identifier for the compartment within the drawer. For example, the address of an item stored in the open drawer 2 shown in FIG. 1 may comprise the following data: cabinet; left-hand most column; top-most drawer; sixth compartment from the front.

Access to a stored item is initiated by a user of the dispensing system 100. Preferably, but nevertheless optionally, the user must first pass a security check to ensure that the user is permitted to access items from the dispensing system 1. Then the user shall identify the specific item that they wish to access. This is optionally achieved by selection of an icon (or other suitable identifier) displayed on the touch screen 20 of the controller means 3 that corresponds to the item to be retrieved. If one or more such items are stored within the cabinet 1, the controller 3 may conduct a decision protocol to determine which item should be released. In dependence upon the address of the specified item selected for release, the controller means 3 will cause the appropriate locking arrangement 80 to be operated so that a specific drawer 2a-2e, in the correct drawer column 4a-4e in the correct cabinet 1, containing the selected item, is released for withdrawal.

The locking arrangement 80 is arranged such that the specific drawer 2a-2e can only be withdrawn to an extent sufficient to expose the compartment 6 of that drawer 2a-2e that contains the selected item and to limit access to other compartments 6 of that drawer from unnecessarily being exposed (thereby prohibiting other (non-selected) items in that drawer 2a-2e from becoming accessible). Preferably, therefore, similar items are stored in neighbouring compartments 6a-6k within the same drawer 2a-2e so that, first, the front compartment 6a can be accessed and emptied, and then later the succeeding compartments can be accessed sequentially with the leading compartments being empty (until re-stocking).

In the present arrangement, the controller means 3 is connected by wired connections to each locking arrangement 80 for each drawer column 4a-4e. It will be appreciated that the controller means 3 may be wirelessly coupled to the HMI 20 and that the controller means 3 may serve a number of cabinets 1 and/or a number of dispensing systems 100. As such, in some arrangements the controller means 3 is not comprised within or affixed to a cabinet 1 itself, but rather, the controller means 3 forms an auxiliary part of the overall dispensing system 100 by being remotely connected to the locking arrangement 80 of one or more cabinets 1. In some envisaged embodiments (and as shown), the controller means 3 is provided as an integral component of the dispensing system 100 and is housed or packaged within the dispensing system 100 preferably, but nevertheless optionally, in the top unit 24 thereof.

A single locking arrangement 80 will now be described with reference to a single drawer column 4a (see FIGS. 2, 3 and 5), it being understood that the cabinet 1 comprises more than one such locking arrangement 80 and that each locking arrangement 80 is preferably the same.

Figure 2:
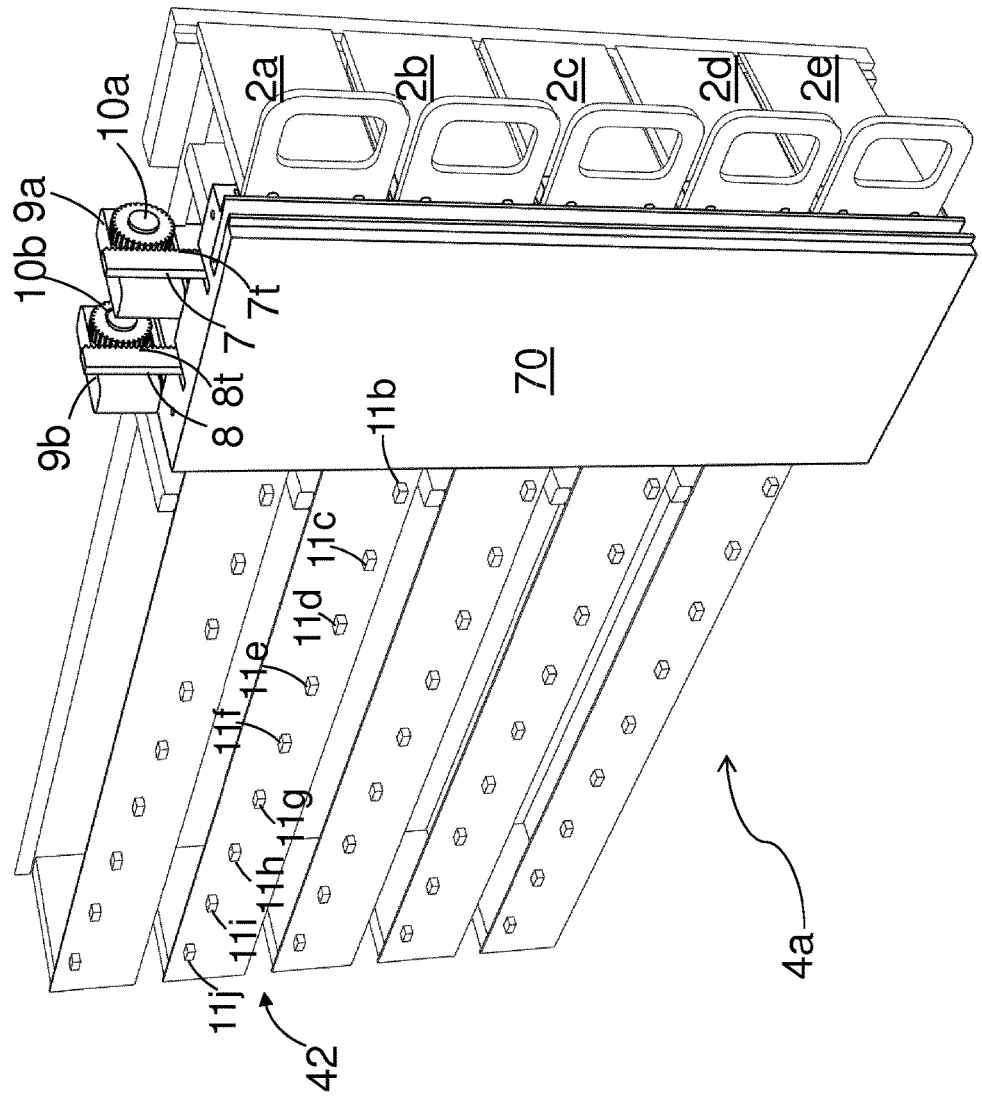
FIG. 2 is a perspective view of a stacked column of drawers of the cabinet of FIG. 1 and a support column for the column of drawers.

As shown in FIG. 2, the locking arrangement 80 comprises two locking mechanisms 32/42, 31/41 which can be operated by the controller means 3 to selectively allow a drawer 2a-2e from the drawer column 4a to be released, and withdrawn to a controlled extent. When the locking arrangement 80 is operated, the two locking mechanisms 32/42, 31/41 are operated in turn, one after the other so that, first, a first locking mechanism 32/42 that is responsible for limiting the extent to which a drawer 2a-2e can be withdrawn is correctly positioned; and then subsequently, a second locking mechanism 31/41 that is responsible for releasing the selected drawer 2a-2e is operated. This ensures that when a drawer 2a-2e is released, the locking arrangement 80 is already primed and positioned to prevent withdrawal of the selected drawer 2a-2e beyond a pre-determined permitted limit.

Figure 6:
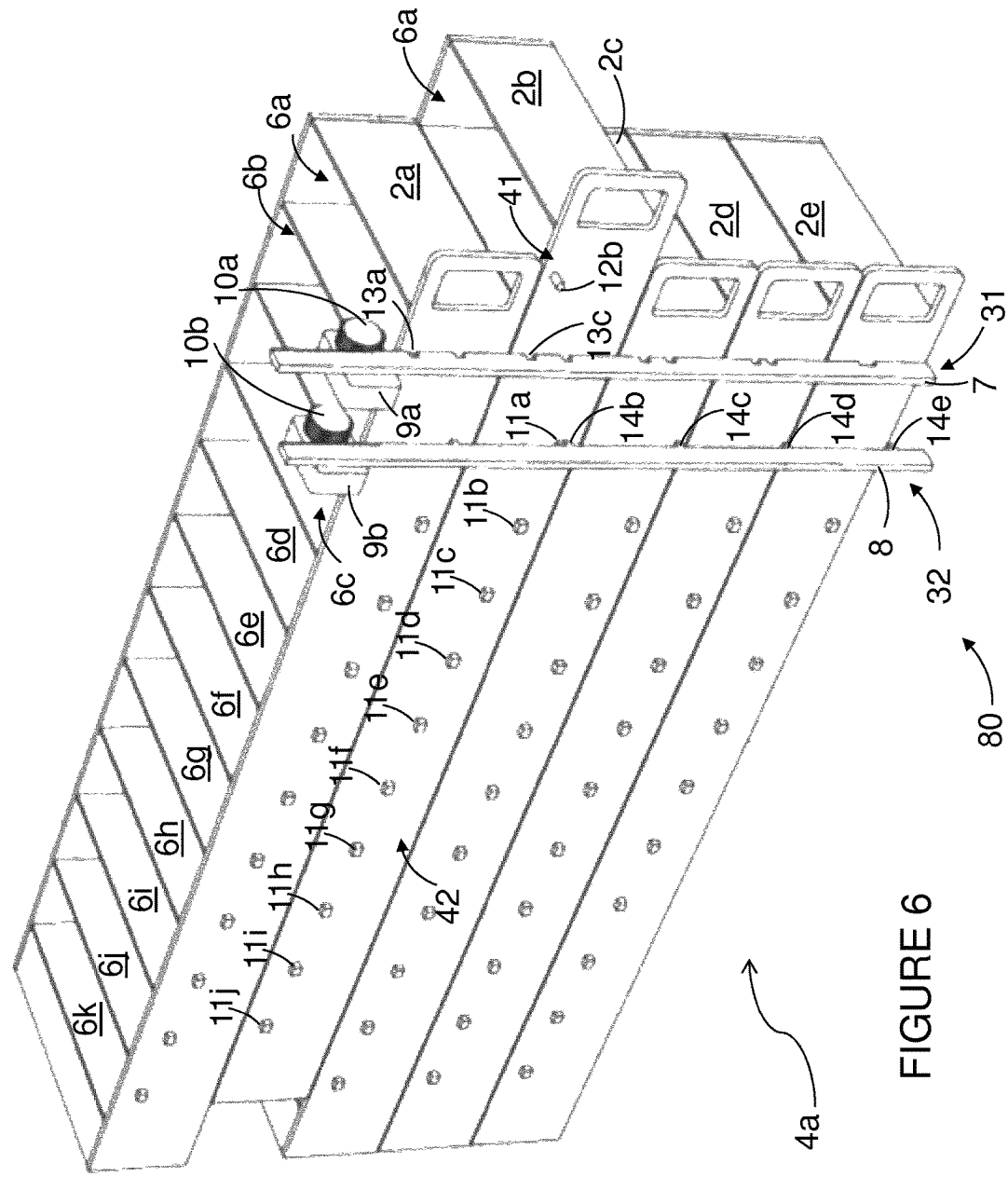
FIG. 6 is a perspective view of a stacked column of drawers of the cabinet of FIG. 1, wherein a single drawer is shown in a released and partially withdrawn state and wherein a locking arrangement for the drawers in the column is shown.
Figure 7:
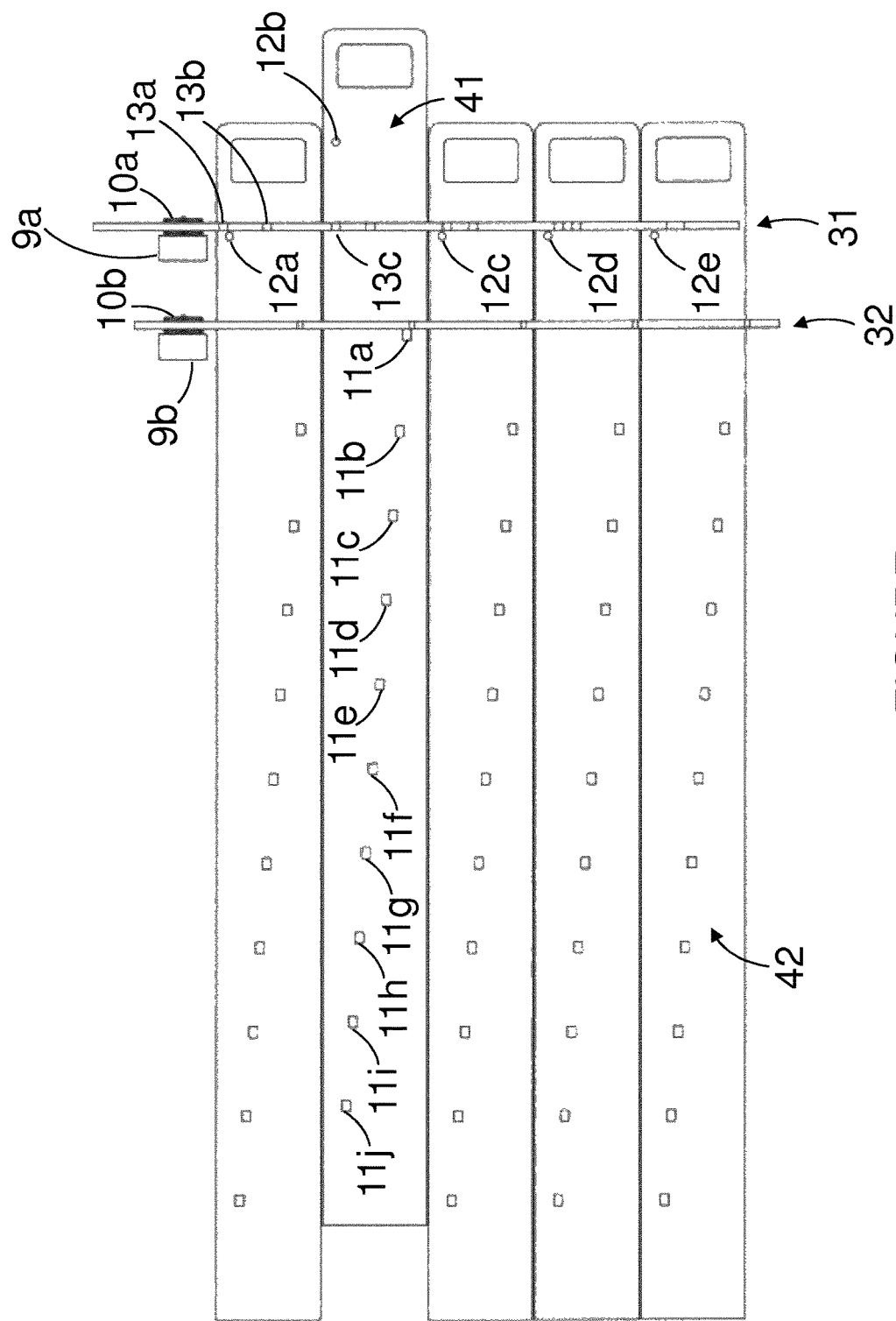
FIG. 7 is a side view of the stacked column of drawers shown in FIG. 2, wherein it can be seen that the locking arrangement is positioned such that a 'drawer select' locking bar is in a position where a single drawer is released for controlled withdrawal and all remaining drawers are locked and are held in a closed position.
Figure 8:
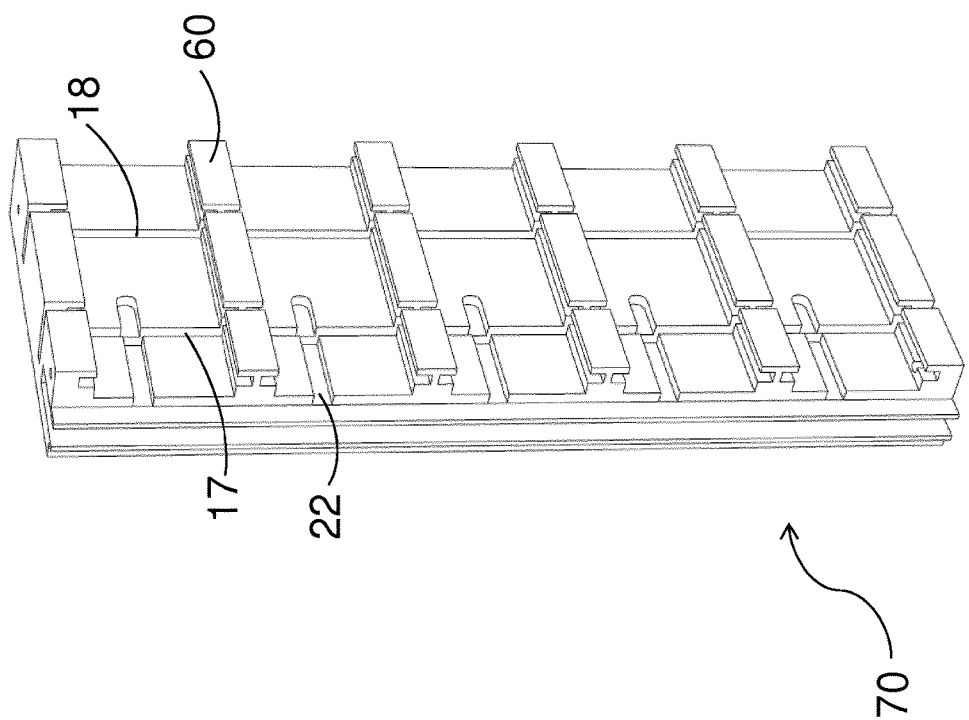
FIG. 8 is a perspective view of an internal column structure which accommodates the locking arrangement for the stacked column of drawers shown in FIGS. 2 to 7.

In FIG. 6, the drawer column 4a comprises a series of five drawers 2a, 2b, 2c, 2d, 2e. The five drawers 2a-2e optionally each have a similar width, depth and length and each comprise a similar number, optionally eleven, compartments 6a, 6b, 6c, 6d, 6e, 6f, 6g, 6h, 6i, 6j, 6k. It will be appreciated that the drawer column 4a is illustrated without the cabinet 1 and without adjacent drawer columns in order to expose the locking arrangement 80 for that drawer column 4a. As such the compartments 6a-6k of the top drawer 2a can be seen in FIG. 6, however, only the first, front most compartment 6a of the second drawer 2b is actually accessible. All other compartments of that second drawer 2b and all compartments of all other drawers 2a, 2c, 2d, 2e are held by the locking arrangement 80 in a locked and closed position internally of the cabinet 1.

Figure 3:
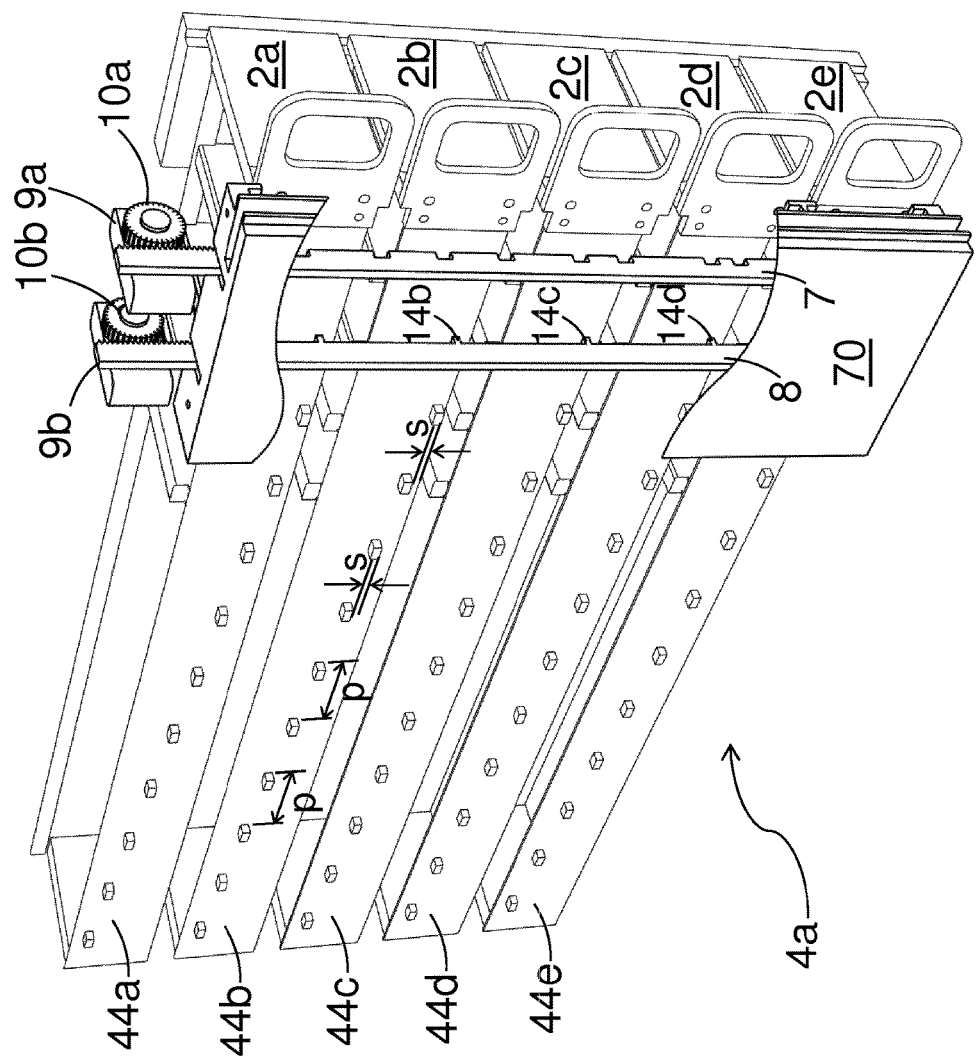
FIG. 3 is a perspective view of the stacked column of drawers of FIG. 2, wherein a portion of the support column has been cut away to show first and second locking bars of first and second locking mechanisms.

As shown in FIGS. 2 and 3, the first locking mechanism 32/42 comprises: a first locking part 32 in the form of a first locking bar 8; and a first latching part 42. The first locking bar 8 is a generally elongate, longitudinally extending bar (see FIGS. 2, 3, 5 and 6) which extends the full height of the drawer column 4a. The first locking bar 8 is disposed alongside a first side of the drawer column 4a. Optionally in the present embodiment, the first locking bar 8 is disposed alongside a left-hand side of the drawer column 4a (as viewed from the drawer fronts) and is adjacent to the left sides 44a-44e of the drawers 2a-2e. In the presently illustrated arrangement, an upper end portion 8t of the first locking bar 8 comprises a series of teeth for coupling to a first drive means 9b which is optionally disposed just above the drawer column 4a. In other arrangements, the first drive means 9b may be alternatively positioned, for example, just below the drawer column 4a and/or the teeth on the upper portion 8t may be replaced with other means suitable for coupling the first locking bar 8 to a first drive means 9b.

Figure 5:
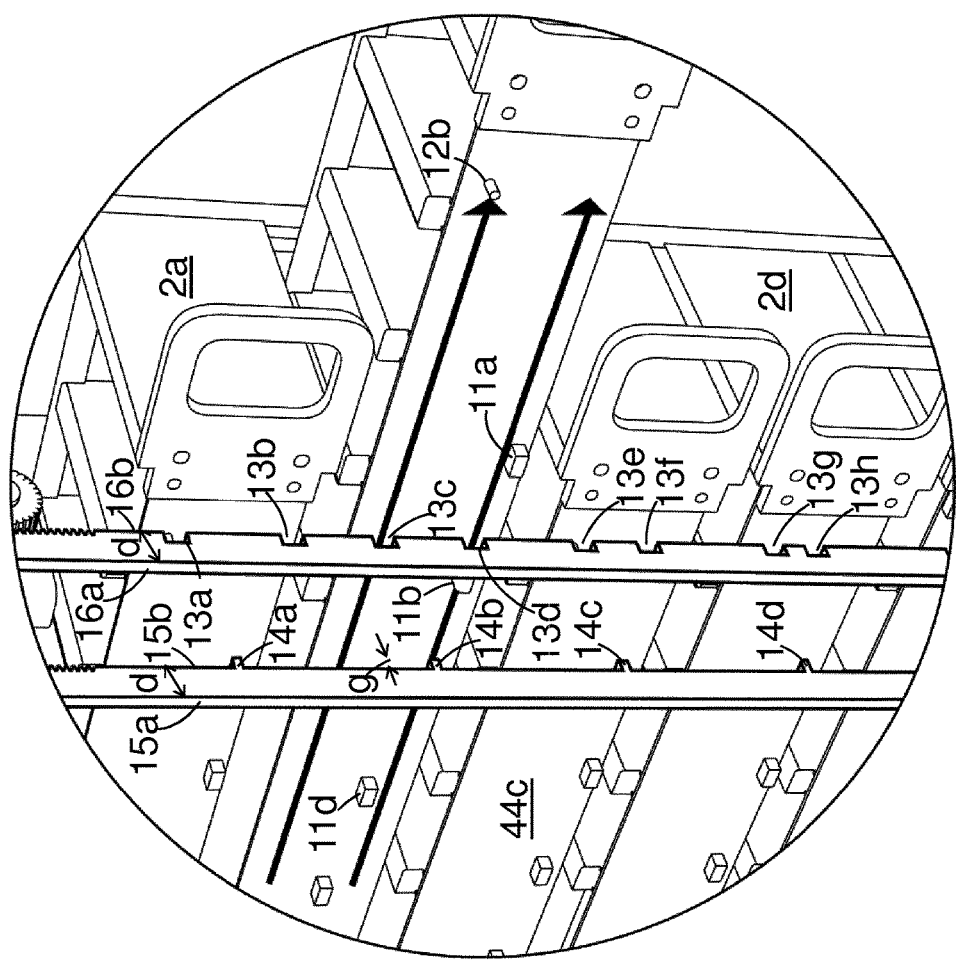
FIG. 5 is an enlarged view of part of the locking arrangement shown in FIG. 4.

As illustrated in FIG. 5, the first locking bar 8 comprises a depth 'd' between an outer edge 15a and an inner edge 15b. A series of projections 14a-14e, which may also be referred to as dogs, legs and lugs, project outwardly from the inner edge 15b of the first locking bar 8 towards the left sides 44a-44e of the drawer column 4a. As such, in the regions of the projections 14a-14e, the first locking bar has a depth that is greater than 'd'. Optionally the projections 14a-14e are provided as integral shaped formations of the first locking bar 8. However, in envisaged embodiments, the projections 14a-14e may be attached, affixed or otherwise mounted to the first locking bar 8. For robustness and ease of manufacture, it is preferred that the projections 14a-14e are integral, precision machined formations of the first locking bar 8.

The first latching part 42 comprises five sequences of laterally arranged detents or pins 11a-11j, one sequence for each drawer 2a-2e. Each sequence comprises a number of detents 11a-11j that correlate to the number of compartments 6a-6k in the drawers 2a-2e. Optionally in the present arrangement eleven compartments 6a-6k are provided and ten detents 11a-11j are provided, one detent 11a-11j for blocking access to the second to eleventh compartments 6b-6k (access to the first compartment 6a being blocked by the second locking mechanism 31/41).

The detents 11a-11j shown are optionally substantially rectangular in cross-section. Other suitable shapes may be used. The detents 11a-11j may be integrally formed with the side 44a-44e of each drawer 2a-2e or may be affixed or mounted thereto. In the present embodiment, the detents 11a-11j are affixed to the sides 44a-44e of the drawers 2a-2e. The detents 11a-11j are sized and arranged along and up the drawer side 44a-44e in laterally spaced pitches 'p' and longitudinally spaced pitches or steps 's' (see FIG. 3).

The second locking mechanism 32/42 comprises: a second locking part 32 in the form of a second locking bar 7, and a second latching part 41. The second locking bar 7 is a generally elongate, longitudinally extending bar (see FIGS. 2, 3, 5 and 6) which extends the full height of the drawer column 4a. The second locking bar 7 is also disposed alongside the left hand side of the drawer column 4a (though this is optional) and is also adjacent to the left sides 44a-44e of the drawers 2a-2e. In the presently illustrated arrangement, an upper end portion 7t of the second locking bar 7 comprises a series of teeth for coupling to a second drive means 9a which is optionally disposed just above the drawer column 4a. In other arrangements, the first drive means 9b may be alternatively positioned, for example, just below the drawer column 4a, and/or the teeth on the upper portion 7t may be replaced by other means suitable for coupling the second locking bar 7 to a second drive means 9a.

As illustrated in FIG. 5, the second locking bar 7 comprises a depth 'd' between an outer edge 16a and an inner edge 16b. A series of release notches 13a-13i, which may also be referred to as "recesses", "apertures" or "holes" are formed within the second locking bar (see FIGS. 3, 4, 5 and 6). As such, in the regions of the notches 13a-13i, the second locking bar 7 has a depth that is less than 'd'. The depth 'd' of the second locking bar 7 is substantially the same as the depth 'd' of the first locking bar 8, such that both first and second locking bars 8, 7 have an inner edge that is spaced from the drawer sides 44a-44e by a similar distance or gap 'g', which gap 'g' is reduced by the presence of a projection 14a-14e or which gap 'g' is increased by the presence of a notch 13a-13i. Optionally, nine release notches 13a-13i are provided.

The second latching part 41 comprises a longitudinally arranged series of five detents or pins 12a, 12b, 12c, 12d, 12e, one located on each drawer 2a-2e. Optionally, the pins have a generally circular cross-section as shown (see FIG. 5 for example). Other shapes of pin 12a-12e may be suitable, for example, rectangular. The pins 12a-12e have a length that is sufficient for the pins 12a-12e to span the gap 'g' and contact the second locking bar 8. The notches 13a-13i therefore have a sufficient depth, shape and format to provide a recess through which a pin 12a-12e can pass.

The first locking part 32 co-operates with the complementarily formed first latching part 42 to limit the extent to which the released drawer 2b (see FIG. 3) can be withdrawn out of the cabinet 1. The second locking part 31 co-operates with the second latching part 41 to lock each drawer 2a-2e of the column 4a within the cabinet 1 and to permit selective release of the drawers 2a-2e from the drawer column 4a.

The first locking part 32 is disposed rear-most and controls the distance by which the selected, released, drawer 2b may be withdrawn from the cabinet 1. In this way access to one or more permitted compartments 6a is controlled. In FIG. 2 it can be seen that the selected drawer 2b is withdrawn a specific distance to only allow a first, frontmost compartment 6a to be exposed for allowing its contents (not shown) to be accessed.

Figure 4:
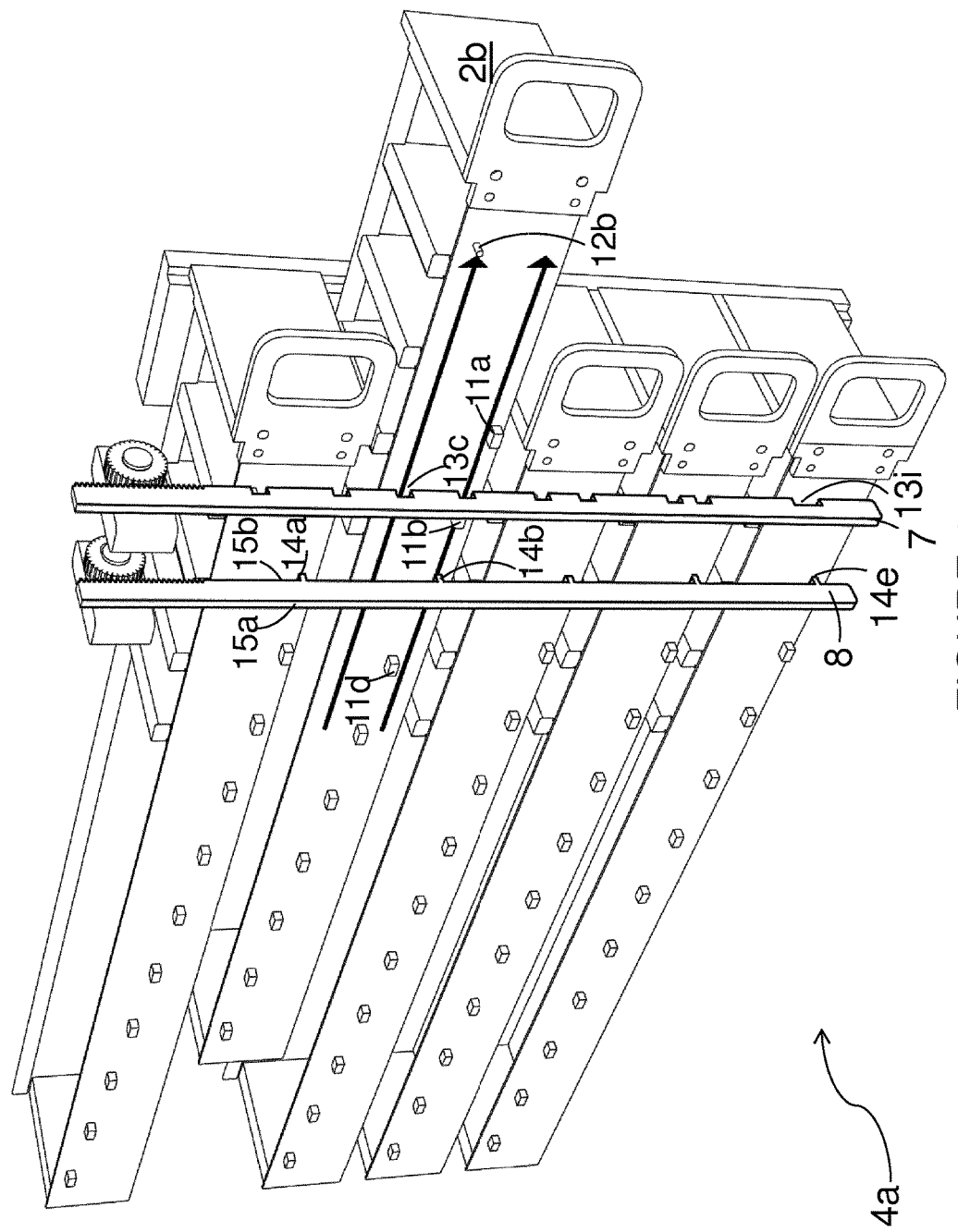
FIG. 4 is a perspective view of the stacked column of drawers of FIG. 2, wherein the support column is not shown at all and wherein a single drawer is shown in a released and partially withdrawn state and wherein a locking arrangement for the drawers in the column is shown.

The second locking part 31 is disposed frontmost and controls access to any one selected drawer 2b in the drawer column 4a and denies access to other drawers 2a, 2c, 2d, 2e. As can be seen in FIG. 4, the position of the second locking part 7 has allowed the first from top drawer 2b to be withdrawn from the cabinet, whilst at the same time locking the other drawers 2a, 2c, 2d, 2e in the cabinet 1 and thus preventing any of the other drawers 2a, 2c, 2d, 2e in the drawer column 4a from being withdrawn.

The second and first locking bars 8, 7 are optionally independently actuated by two separate drive means 9a, 9b. In the present embodiment, the first drive means 9b for the first locking bar 8 is provided by a first electric motor 9b; and a second drive means 9a for the second locking bar 7 is provided by a second electric motor 9a. The drive means 9a, 9b for each of the second and first locking bars 7, 8, are arranged to independently raise and lower the second and first locking bars 7, 8 respectively. Optionally this is achieved using a rack and pinion means 10a, 10b coupled to each drive means 9a, 9b, and coupled to the upper toothed portions 8t, 7t of the first and second locking bars 8, 7.

In the presently illustrated arrangement, the laterally arranged sequences of detents or pins 11a-11j of the first latching part 42 is located on the left side 44a-44e only of each of the drawers 2a-2e in the drawer column 4a. Each detent or pin 11a-11j within a sequence of detents on a drawer 2a-2e has a unique position on that drawer 2a-2e. Optionally, the unique position of each pin 11a-11j on a single drawer 2a-2e is achieved by virtue of the detents 11a-11j in that sequence being arranged along a gradient, optionally in a gradually ascending manner (as viewed from the front of the drawer to the back of the drawer). The pins 11a-11j on each drawer 2a-2e are spread along the length of the drawer and the lateral position (between the front and rear of the drawers 2a-2e) of each pin 11a-11j corresponds to a distance to which the drawer can be withdrawn. As such, the pins 11a-11j of each sequence are pitched laterally in increments 'p' (see FIG. 3), which optionally correspond to the positions of internal compartments 6b-6k; and the pins 11a-11j of each sequence are pitched in ascending pitches or steps 's' vertically (longitudinally) (see FIG. 3) in increments, which optionally correspond to integer numbers of incremental movements of the first locking bar 8 (governed by the rack and pinion 10b and teeth in the upper portion 8t of the first locking bar 8).

The pins 11a-11j can co-operate with the appropriately positioned projections or dogs 14a-14e of the first locking bar 8. By adjusting the relative vertical position of the first locking bar 8 as required, one of the longitudinally arranged projections or dogs 14a-14e on the first locking bar 8 can be aligned with an appropriate pin 11a-11j of the laterally arranged sequence of detents or pins 11a-11j, for abutment or engagement with that pin 11a-11j to block passage of the drawer 2b that is to be released beyond a pre-determined and pre-set limit.

The drawer column 4a is supported by a column member 70 (see FIGS. 2 and 8) that is optionally an aluminium extrusion comprising: integral drawer guide means 60; a second guide in the form of a channel 17 for the second locking bar 7; a first guide in the form of a channel 18 for the first locking bar 8; and a third channel, recess or guide 22 for the pins 12a-12e of the second latching part 41.

The second and first locking bars 7 and 8 are positioned at least partially within and guided by the second and first guides 17, 18 within the column member 70. This ensures that movement caused by the drive means 9a, 9b is translated into a purely vertical movement of the locking bars 7, 8 such that their respective positions are accurately controlled to ensure, as required, movement of a pin 12a-12e; 11a-11j through the locking bar 7, 8 can be blocked or permitted as required. The location of the second and first locking bars 7 and 8 at least partially within the second and first guides 17, 18 further shields and conceals the locking arrangement 80 to further improve its tamper resistance and increase its security.

The column member 70 may be formed as an integral internal component of the cabinet 1 or may be attached to an internal component of the cabinet 1. At least one column member 70 is provided for each drawer column 4 and the integral drawer guide means 60 for each drawer 2a-2e provides a runner (optionally for a top and bottom edge of each drawer 2a-2e) to ensure smooth and controlled withdrawal, straight into and straight out of the cabinet 1.

Optionally, because the first and second locking bars have substantially the same depth 'd', they can both be housed within the same depth of groove 17, 18 within the support column 70. In other embodiments, where the first and second locking bars 8, 7 have different widths, the first and second guide channels 17, 18 may also have different depths accordingly.

As shown in FIG. 4, the height of the first locking bar 8 of the first locking part 32 is adjusted so that the second dog (projection) 14b on the first locking bar 8 is positioned to engage, co-operate or otherwise interconnect with the pin 11c on the drawer 2b. In this way, when the second locking part 31 and second latch 41 operate to release the drawer 2b, the third pin 11c abuts or otherwise connects and contacts second dog 14b of the first locking bar 8 and the distance to which that selected released drawer 2b can be withdrawn is thereby limited and only the first three compartments 6a-6c of the released drawer 2b are permitted to be accessed. An enlarged view of the first and second locking mechanisms 32/42, 31/41 in operation as described is shown in FIG. 5.

As shown in FIG. 5, the height of the first locking bar 8 of the first locking part 32 is adjusted so that the second dog (projection) 14b on the first locking bar 8 is positioned to engage, co-operate or otherwise interconnect with the pin 11a on the drawer 2b. In this way, when the second locking part and second latch 31/41 operate to release the drawer 2b, the first pin 11a abuts or otherwise connects and contacts the second dog 14b of the first locking bar 8 and the distance to which that selected drawer 2b can be withdrawn is thereby limited and only the first compartment 6a of the released drawer 2b is permitted to be accessed.

Figure 9:
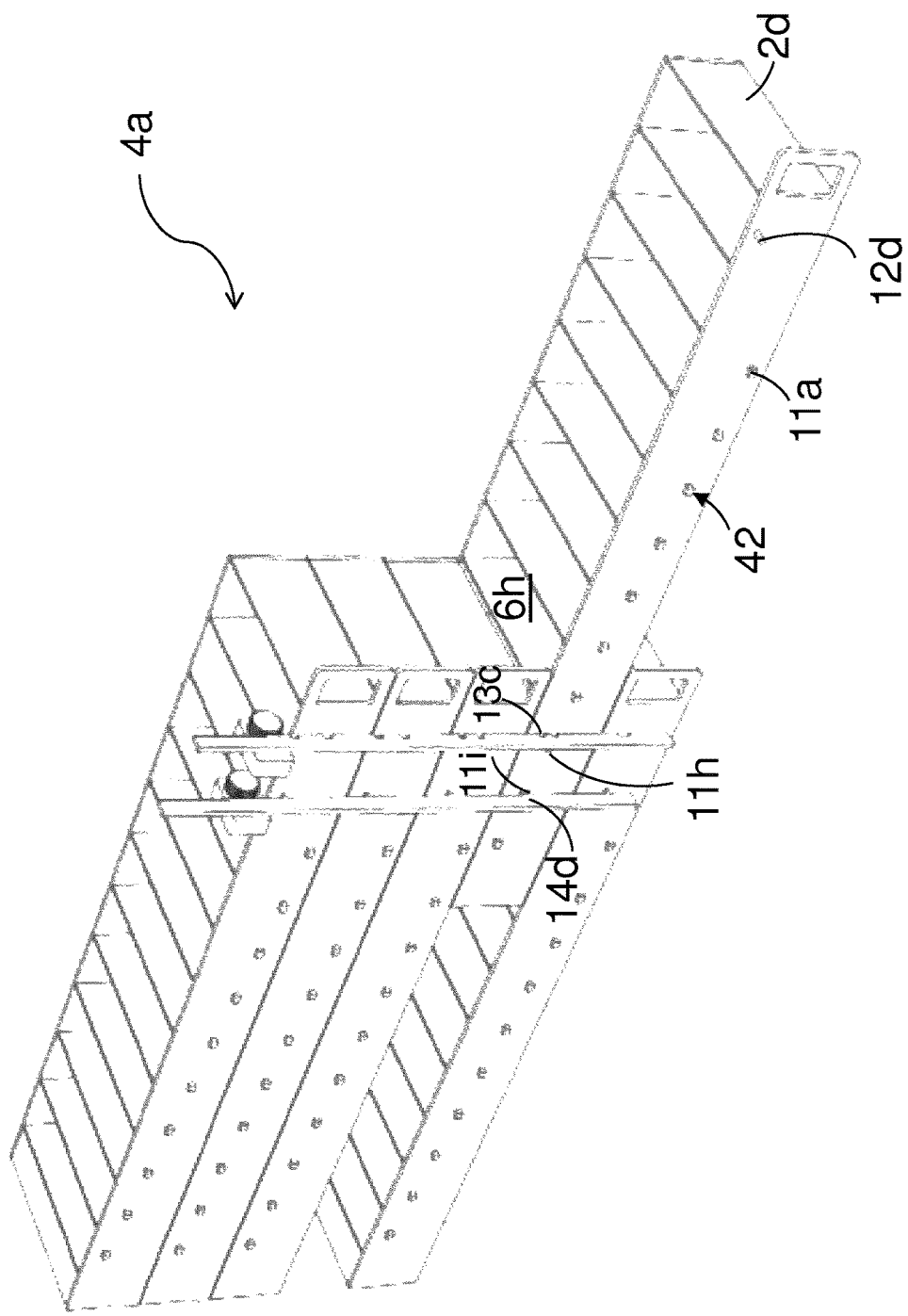
FIG. 9 is a further perspective view of the stacked column of drawers shown in FIG. 2 albeit with the locking arrangement positioned to release a first from bottom drawer in the stack which is partially withdrawn to a controlled extent whilst all other drawers are locked and held in a closed position.
Figure 10:
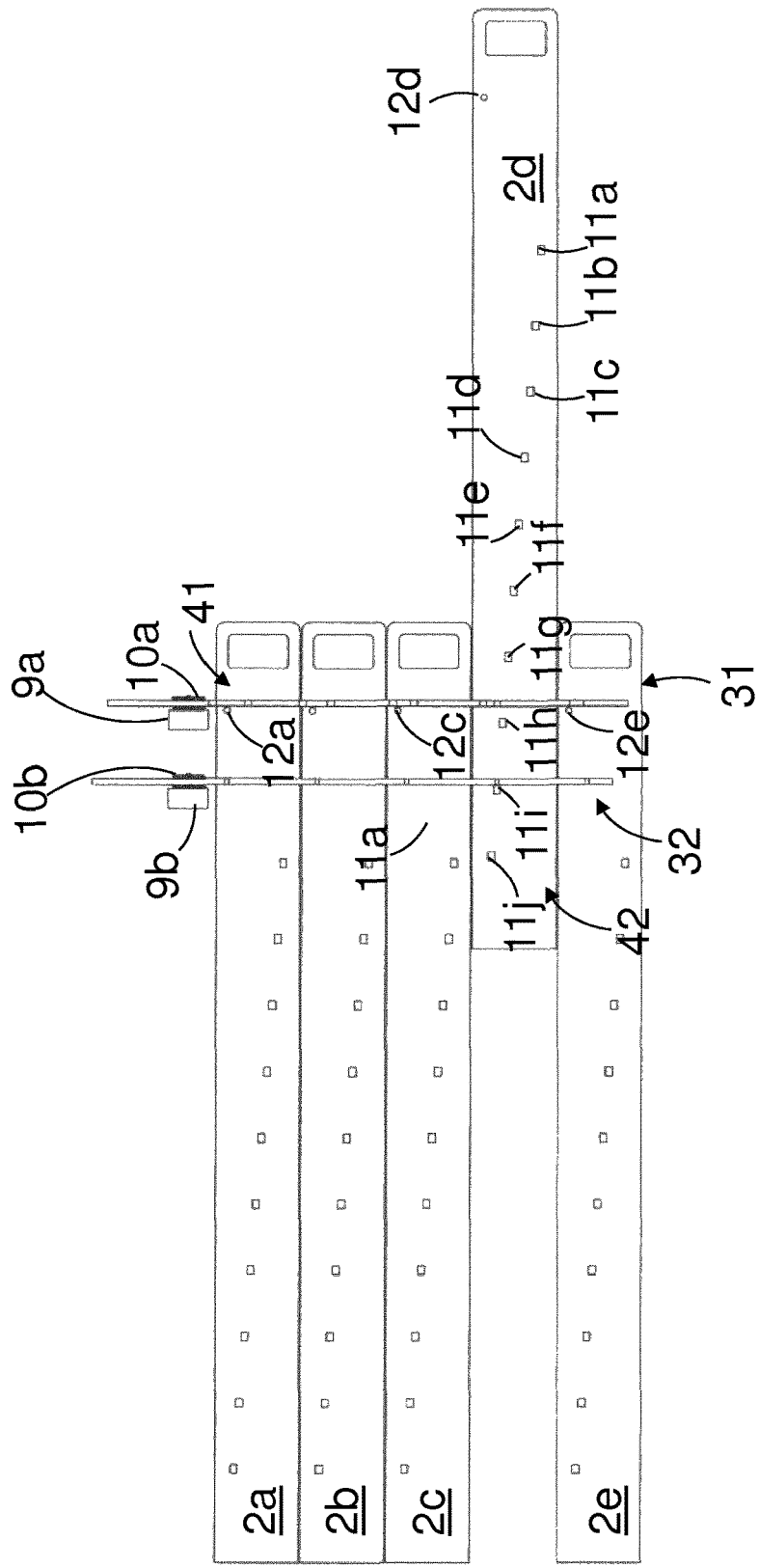
FIG. 10 is a side view of the stacked column of drawers shown in FIG. 5, wherein it can be seen that the locking arrangement is positioned such that a 'drawer select' locking bar is in a position where a first from bottom drawer is released for controlled withdrawal and all remaining drawers are locked and are held in a closed position.

As shown in FIGS. 9 and 10, the height of the first locking bar 8 of the first locking part 32 is adjusted so that a fourth dog 14d on the first locking bar 8 is at about the same height as the height of the ninth pin 11i on the drawer 2d. In this way the ninth pin 11i, when it reaches the first locking bar 8, connects, engages or otherwise co-operates with the dog 14d and limits further withdrawal of the released drawer 2d such that only the first to eighth compartments 6a-6h can be accessed.

It will be understood that by operating the first locking mechanism 32/42 to set the limit to which a drawer can be removed before the second locking mechanism 31/41 is operated, ensures that a drawer cannot be pulled out beyond the pre-determined limit.

In the present embodiment, the longitudinally arranged series of detents or pins 12a-12e of the second latching part 41 are located on the left-side of the drawers 2a-2e proximate to a front end of the drawers 2a-2e. Optionally one pin 12a-12e is provided on each drawer 2a-2e proximate to a front top corner of the left side of each drawer 2a-2e.

The series of notches 13a-13i of the second locking bar 7 are sized, positioned and arranged to co-operate with the pins 12a-12e of the second latching means 41. By adjusting the relative vertical position of the front most second locking bar 7, as required, a notch 13a-13i can be aligned or mis-aligned with a pin 12a-12e of the longitudinally arranged series of detents or pins 12a-12e. In FIGS. 4, 5, 6 and 7, it can be seen how the vertical height of the second locking bar 7 has been adjusted such that a third notch 13c is aligned with the height of the second pin 12b. The pin 12b can pass through the third notch 13c and thereby the drawer 2b can be released for withdrawal, albeit to a limited extent controlled, as described above, by the pre-positioning of the first locking bar 8. In FIGS. 9 and 10, it can be seen how the vertical height of the second locking bar 7 has been adjusted such that a seventh notch 13g is aligned with the height of the fourth pin 12d. The fourth pin 12d can pass through the seventh notch 13g and thereby the drawer 2d can be released for withdrawal, albeit to a limited extent controlled, as described above, by the pre-positioning of the first locking bar 8.

When a stored item is selected for access, the controller means 3 may first conduct one or more security and/or payment and/or inventory checks to determine that the item is available and/or is permitted to be released to the identified user. Once it has been determined that a stored item should be released, the controller means 3 determines a location of such an item and, in dependence upon the location of the item, controls the drive means 9a, 9b of the second and first locking parts 31, 32. Preferably, but nevertheless optionally, the address of the item may be indicative of positional data for each of the second and first locking bars 7, 8 and address data may be converted into a sequence of movements of the drive means 9a, 9b.

In FIG. 3, the controller means 3 has caused the first drive means 9b to adjust the position of the first, rear locking bar 8 such that the sequence of dogs 14a-14e which are provided on the inner side 15b of the first locking bar 8, engage with the laterally arranged series of detent pins 11a-11j on the side 44a-44e of each drawer 2a-2e. As shown, the laterally arranged series of detent pins 11a-11j of each drawer 2a-2e are graduated and positioned in dependence upon the position of a corresponding compartment 6a-6j. In other words, the detent pins 11a-11j of each series 42 are arranged in an ascending order but displaced horizontally by the pitch of the drawer's internal compartments 6a-6j. The detent pins 11a-11j engage with the dogs 14a-14e of the first locking bar 8 so as to prevent the released drawer 2a from being opened beyond an authorised distance. Thus, by raising the first locking bar 8 to an appropriate and pre-set position (height), the withdrawal distance of the released drawer 2a from the cabinet 1 can be controlled without the necessity of distance measuring means, and such that the locking arrangement 80 cannot be overcome by excessive withdrawal speed.

Additionally, in FIG. 6 it is shown how a permitted request to access an item held in the first compartment 6a of the first from top drawer 2b was effected by the controller means 3. The controller means 3 has caused the second drive means 9a to position the second, front locking bar 7 such that a notch 13c is aligned with the vertical position of pin 12b of the second latching part 41. The pin 12b can pass through the notch 13c, which allows movement of the drawer 2b. At the same time, the position of the second locking bar 7 and its other notches, with respect to the other pins 12a, 12c-12e prohibits any other drawer 2a, 2c-2e from being withdrawn. In other words, the locking bar 7 prohibits access to the other drawers 2a, 2c-2e by blocking the path of the remaining pins 12a, 12c-12e.

In a fully lowered position, the second locking bar 7 blocks all detent pins 12a-12e, and horizontal movement of all drawers 2a-2e is prevented such that no drawer 2a-2e can be opened. Raising the second locking bar 7 vertically upward sequentially positions a notch 13a, 13c, 13e, 13g, 13i adjacent to a detent pin 12a-12e such that each drawer 2a-2e, selectively and individually, can be withdrawn from the cabinet 1. In other embodiments, the notches 13a-13i in the second locking bar 7 of the second locking part 31 and the co-operative pins 12a-12e of the second latching part 41 may be arranged such that non-sequential movement of the locking bar 7 is required to align a release notch 13a, 13b with a corresponding locking pin 12a-12e.

In the present arrangement, the second locking bar 7 is provided with nine notches 13a-13i. Optionally, the notches 13b, 13d, 13f, 13h, 13i on the second locking bar 7 can be positioned such that a particular incremental movement of the second locking bar 7 will release all of the drawers 2a-2e in the column 4a for rapid restocking and drawer removal without the necessity of additional mechanisms. Beneficially therefore a drawer 2a-2e is easily, completely withdrawn from the cabinet 1. Unlike the systems of the prior art, there are no wired electrical connections between the drawers 2a-2e and the cabinet 1. The locking arrangement of the present disclosure avoids the need for electrical wiring to connect the drawer and cabinet and this is particularly advantageous for re-stocking purposes because a drawer can be completely removed in a very straightforward manner and without requiring any disconnection of any "permanent" electrical, wired connections between the drawer 2a-2e and cabinet 1. A drawer having only empty compartments can be fully removed and quickly and easily replaced with a drawer whose compartments are loaded with articles. In this way a "loaded drawer" operates like a cartridge and provides for faster and more efficient replenishment which is less labour intensive and less prone to stocking errors (which may arise for example by putting the wrong article in a compartment). Down-time of the dispensing system 100 is additionally reduced and the security of the contents of the cabinet 1 may also be improved.

In the arrangement shown in FIGS. 1 to 10 an optional sequence of movements of the front and rear locking bars 7, 8 and the status of each drawer 2a-2e in a column 4a is summarised in tables 1 and 2 below.

TABLE 1

Position of Front Locking Bar (7) and status of drawers 2a-2e

Position of Front Locking Bar (7)

| Position Number | Front Locking Bar Distance above lowest level (0 mm) | Status of Drawers 2a-2e |
|---|---|---|
| 0 | 0 mm | all drawers 2a-2e locked. (see FIGS. 2 and 3) |
| 1 | 3 mm | all drawers 2a-2e unlocked. (not shown) |
| 2 | 6 mm | only drawer 2a released; drawers 2b-2e locked. (see FIG. 1) |
| 3 | 9 mm | only drawer 2b released; drawers 2a and 2c-2e locked. (see FIGS. 4, 5, 6, 7) |
| 4 | 12 mm | only drawer 2c released; drawers 2a, 2b, 2d and 2e locked. (not shown) |
| 5 | 15 mm | only drawer 2d released; drawers 2a-2c and 2e locked (see FIGS. 9 and 10) |
| 6 | 18 mm | only drawer 2e released; drawers 2a-2d locked. (not shown) |

TABLE 2

Position of Rear Locking Bar (8) and status of compartment 6a-6j

Position of Rear Locking Bar (8)

| Position Number | Rear Locking Bar Distance above lowest level (0 mm) | Status of Compartments 6a-6j |
|---|---|---|
| 0 | 0 mm | all compartments locked |
| 1 | 3 mm | compartment 6a selected (see FIGS. 6 and 7) |
| 2 | 6 mm | compartment 6b selected |
| 3 | 9 mm | compartment 6c selected (see FIGS. 4 and 5) |
| 4 | 12 mm | compartment 6d selected |
| 5 | 15 mm | compartment 6e selected |
| 6 | 18 mm | compartment 6f selected (see FIG. 1) |
| 7 | 21 mm | compartment 6g selected |
| 8 | 24 mm | compartment 6h selected (see FIGS. 9 and 10) |
| 9 | 27 mm | compartment 6i selected |
| 10 | 30 mm | compartment 6j selected |

Referring now to FIGS. 11 to 14 there is shown an additional embodiment of the dispensing system of the present disclosure. In the additional illustrated embodiments, like numerals have, where possible, been used to denote like parts, albeit with the addition of the prefix "100" and "200" to indicate that these features belong to the alternative embodiments respectively.

Since there are many features in common between the cabinet 201 of the second embodiment and the cabinet 1 of the dispensing system 100, only the differences will be described in detail, it being understood that other features are as described above.

Figure 11:
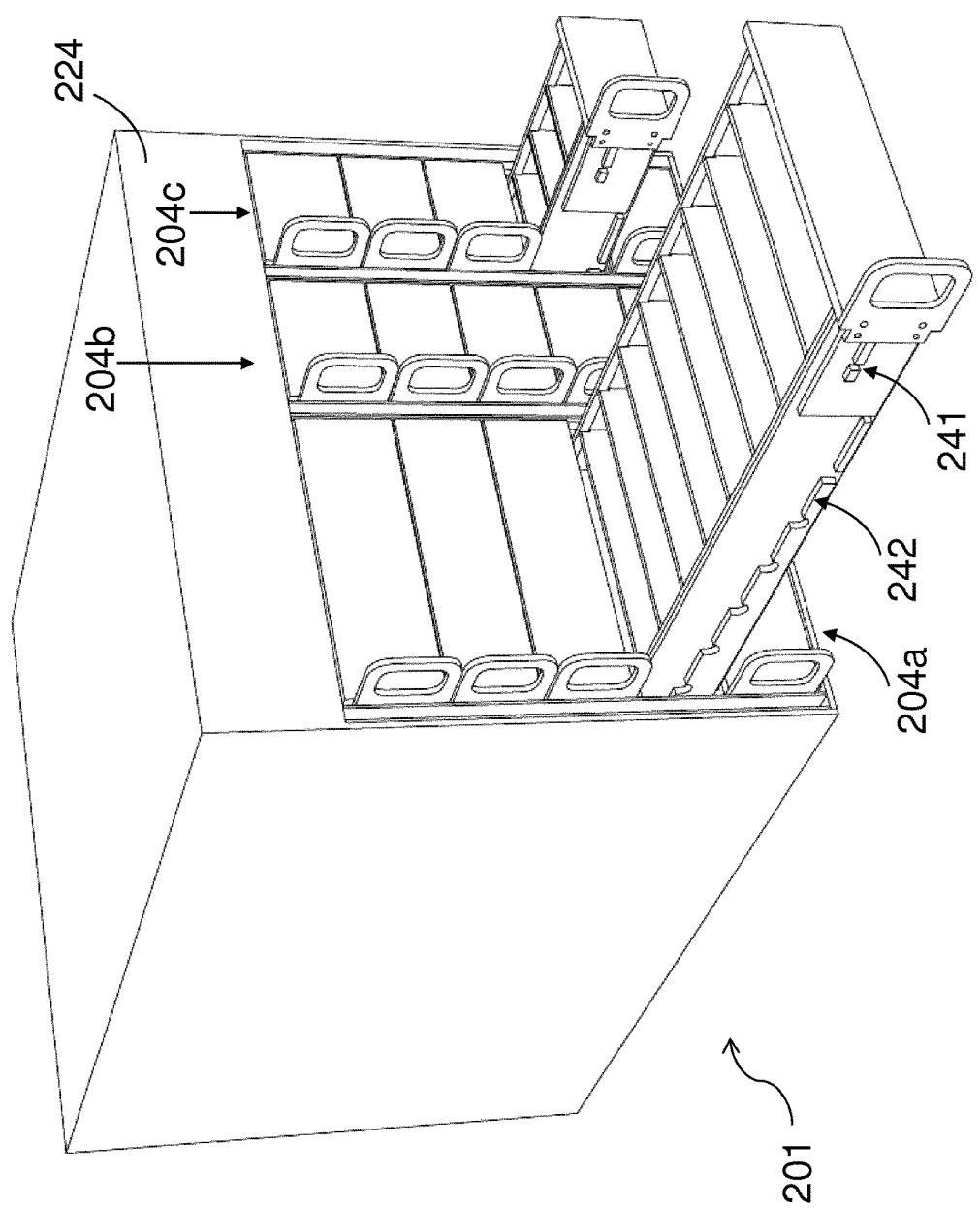
FIG. 11 is a cabinet housing drawers for a dispensing system according to a second embodiment of the disclosure. The cabinet is shown with two drawers from different columns released and partially withdrawn to a limited and controlled extent whilst all other drawers remain locked in a closed position within the cabinet.
Figure 14:
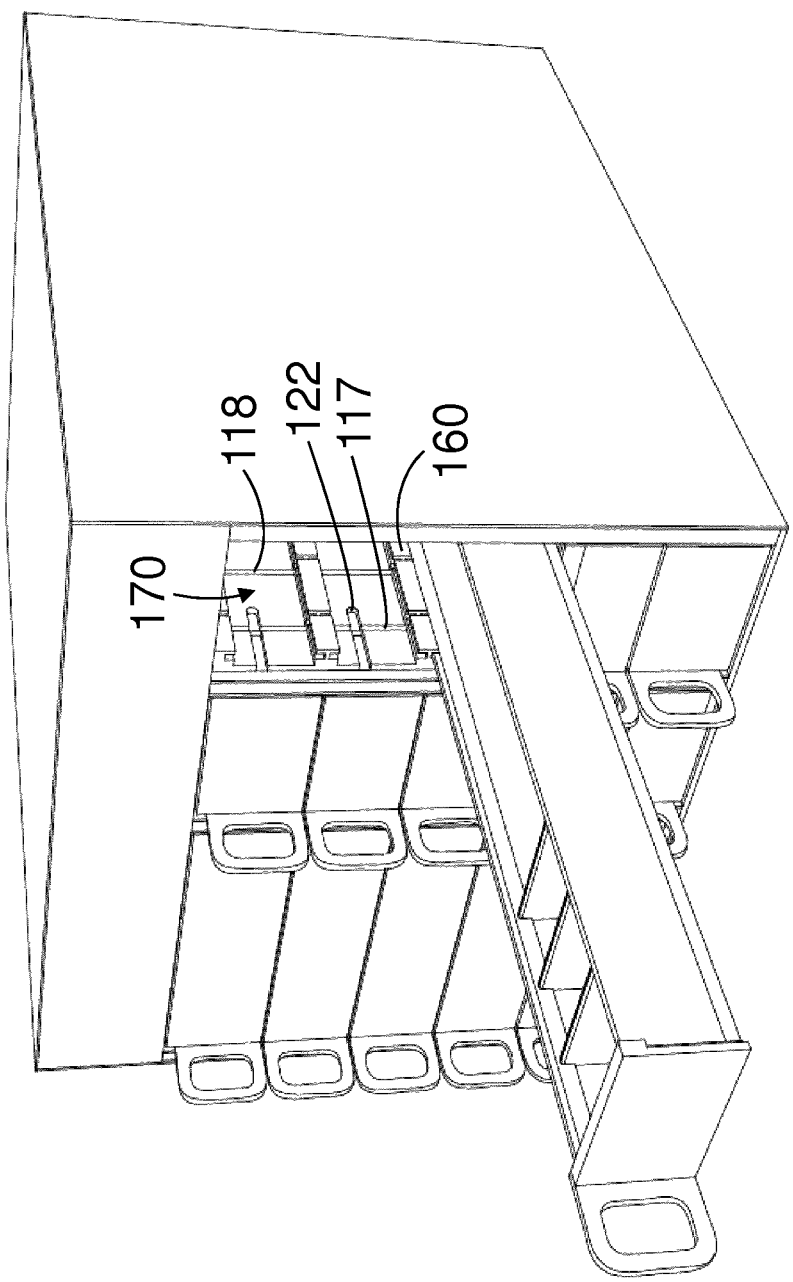
FIG. 14 is a perspective view from the other side of the cabinet of FIG. 11, showing part of an internal column structure (such as that shown in FIG. 4), in situ within the cabinet, but without the first and second locking parts disposed therein.

The cabinet 201 in FIGS. 11 and 14 comprises three drawer columns 204a, 204b, 204c, of differing widths, and each have a stack of five drawers each. Each drawer again has a series of compartments. Three locking arrangements are provided, one for each drawer column. A controller unit is not shown in FIGS. 11 and 14.

Figure 12:
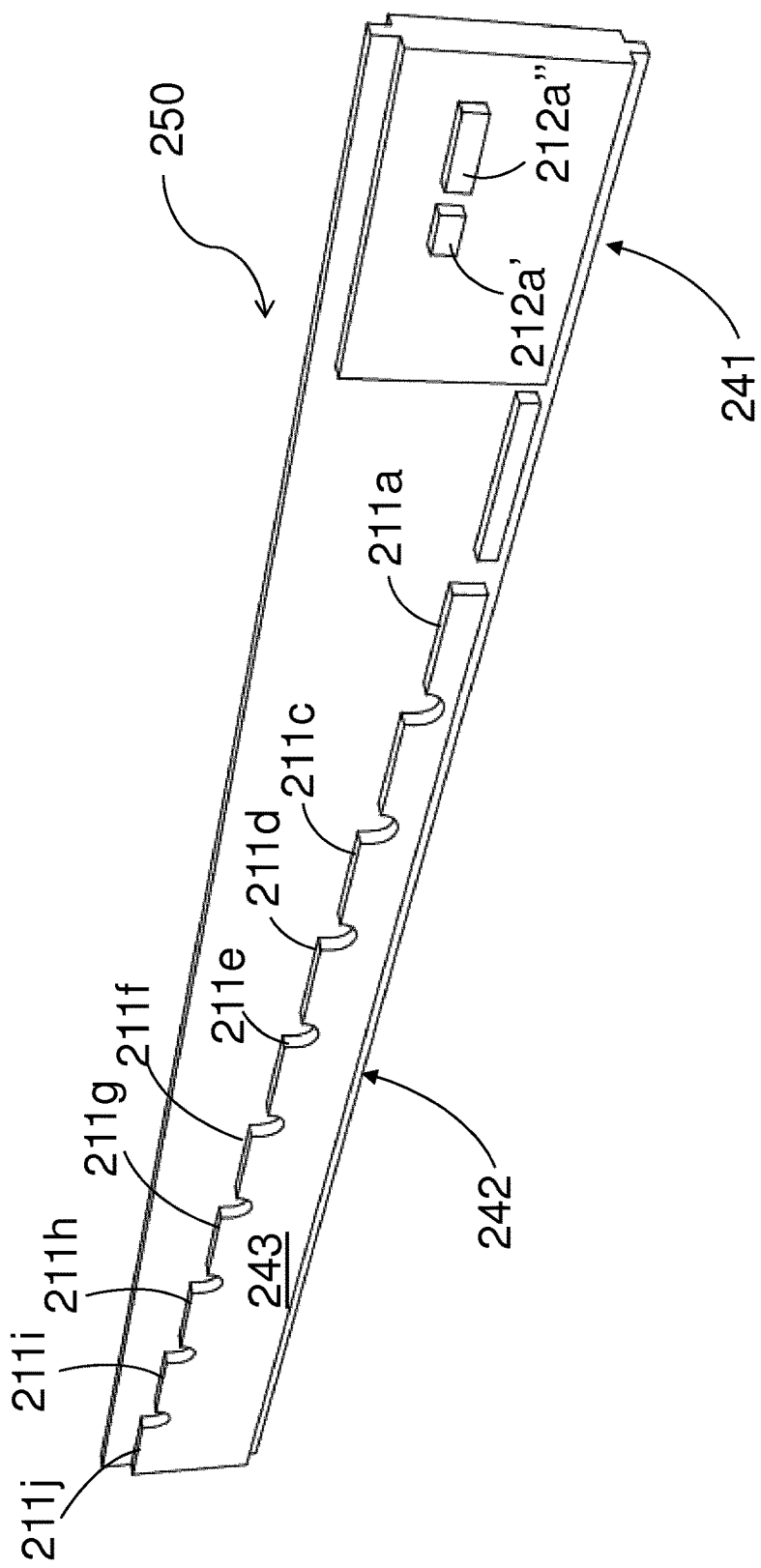
FIG. 12 is a perspective view of a drawer component comprising parts of second and first latching features according to the second embodiment of the invention.
Figure 13:
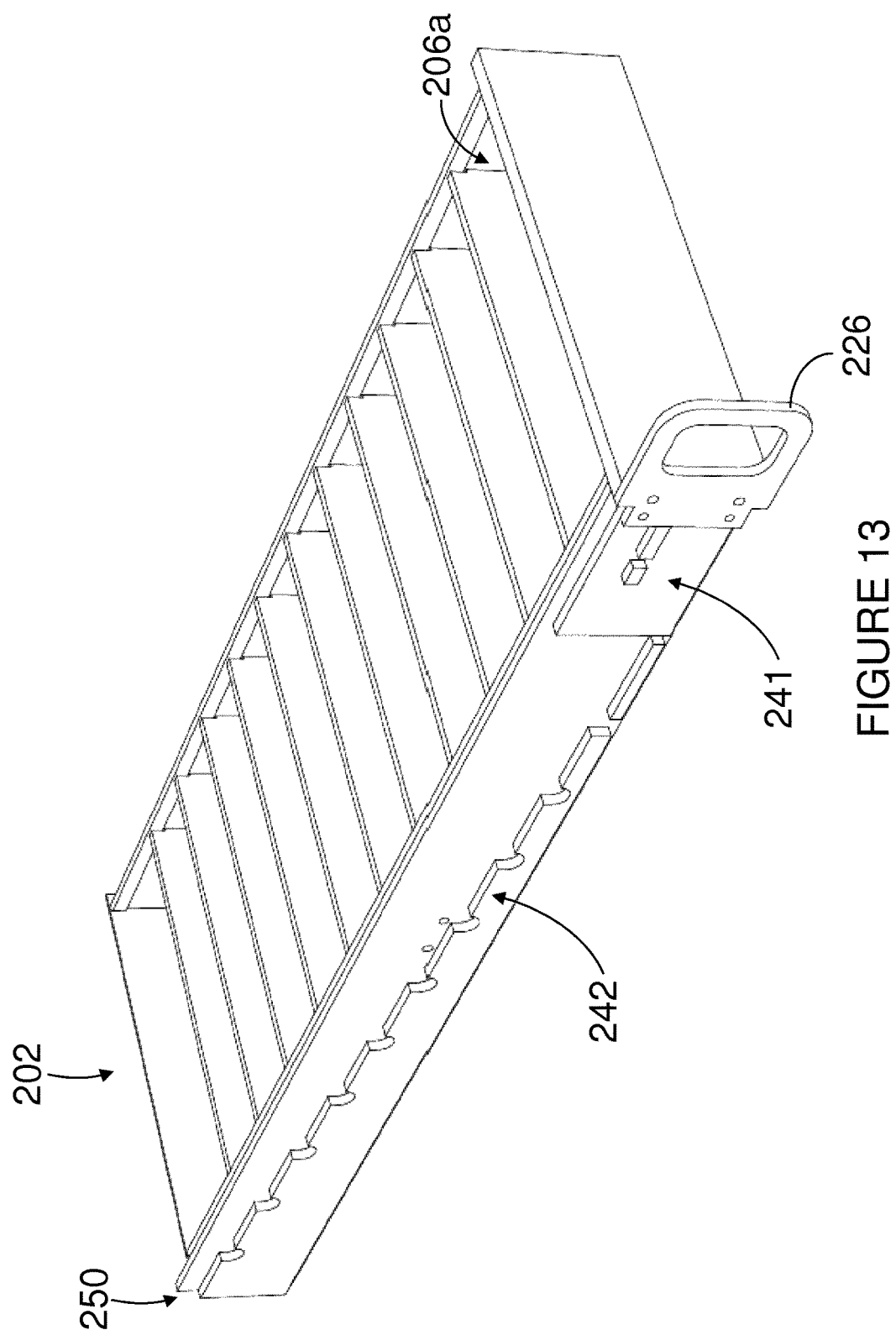
FIG. 13 is a perspective view of a drawer for use in the cabinet of FIG. 11 showing the drawer component of FIG. 12.

As can be seen in FIGS. 12 and 13, a drawer component 250, which may be attached to the side of a drawer, or which may indeed be the side of a drawer, comprises a first latching part 242. The first latching part 242 comprises a single piece, substantially planar, formed guide 243 which may be machined from aluminium or steel or other suitable material. A graduated series of steps 211a-211j is shaped into the formed guide 243. Each step 211a-211j has a riser, which is optionally slightly curved or rounded, against which the projecting dog or pin provided on and extending from the inner edge of the first, rear locking bar (not shown) can catch, mate, abut or otherwise engage to limit horizontal (lateral) and outward movement of a drawer 202 (see FIG. 13). The curved or rounded riser optionally slopes into a recessed portion, which is shaped to further enhance the co-operative engagement between the first latch 242 and the first locking part (not shown in FIGS. 11-14).

Again each step riser of a sequence of latches 211a-211j on a single drawer is provided in a unique location. The steps 211a-211j of each sequence are optionally spaced in both lateral and longitudinal pitches i.e., in gradually ascending positions from the front to the back of the drawer. In this way, as the first locking bar is incrementally raised, the sequence of projections positioned thereon will incrementally raise and adopt a position corresponding to a selected one of the step risers 211a-211j. In this way, vertical linear adjustment in the height of the first, rear, locking bar determines which in the sequence of recesses 211a-211j, a dog or projection on the first, rear locking bar will engage, when a released drawer is moved, thus again pre-determining and limiting the extent to which a released drawer can be withdrawn from the cabinet 201.

As can be seen in FIGS. 12 and 13, the second latching part 241 comprises a longitudinally arranged series of pairs of spaced and substantially rectangular pins or detents 212a', 212a". One pair 212a', 212a" is provided on each drawer (only one pair is shown in FIG. 13). Each pair of spaced and substantially rectangular pins or detents 212a', 212a" can be aligned with suitably sized, shaped and positioned notches provided on the second locking bar as with the first embodiment (not shown in FIGS. 11-14).

Three column members 170 are provided, one each for each of three locking arrangements provided for the three drawer columns. In FIG. 14, the position of the right-hand-most column member 170 can be seen. In FIG. 14 the cabinet 201 is shown without the locking arrangements in order to illustrate the guide channels 117, 118, 122 of the column support; and to show the drawer guide 160 in which a top edge of the released drawer runs.

It can be appreciated that various changes may be made within the scope of the present invention. For example, in other embodiments of the invention it is envisaged that the mechanical co-operative and complementary locking features may have a different form, shape, arrangement, number and configuration as shown herein, provided that a position of a second moveable locking element can be used to control which of a column of drawers may be released; and such that a position of a first moveable locking element can be used to control the extent to which the released drawer may be withdrawn, which second and first moveable locking elements are independently driven and are optionally controlled and coupled to a controller which determines whether the second and first moveable locking parts should be moved and if so by how much in order to control the secure and restricted access to items secured within a cabinet.

In other embodiments, the first and second locking mechanisms 32/42, 31/41 may not be situated on the left side of a drawer column, but may be located on the right side of the drawer column. In other embodiments, a first locking mechanism may be located on one side, say the left side, and the second locking mechanism may be located on the other side, say the right side. Beneficially however, by housing the first and second locking mechanisms 32/42, 31/41 on the same side, they can both be housed within the same column support 70 and beneficially, packaging of the locking mechanisms is more simple, is more efficient in the space required and requires fewer column supports.

The invention claimed is:

1. A controlled access dispensing system comprising:
a controller;
a cabinet;
a first drawer column comprising a plurality of drawers housed within said cabinet, each of said plurality of drawers comprising a first side, a second side, a bottom, a front end, and a rear end; and
a locking arrangement for said first drawer column, the locking arrangement being coupled to said controller and comprising first and second co-operative locking mechanisms operable by said controller to selectively allow a selected drawer from the first drawer column to be released and withdrawn only to a pre-determined extent, said first and second locking mechanisms being operated in turn, one after the other, so that the first locking mechanism, responsible for limiting the pre-determined extent to which the selected drawer is withdrawn, is correctly positioned, and then subsequently the second locking mechanism, responsible for releasing the selected drawer, is operated and thereby when the drawer is selected for release and the locking arrangement operated, the first locking mechanism is first positioned to prevent withdrawal of that selected drawer beyond the pre-determined extent, before that selected drawer is released for withdrawal, wherein the first locking mechanism responsible for limiting the pre-determined extent to which the selected drawer is withdrawn comprises:
(i) a first latching part comprising a laterally arranged sequence of formations provided on a side of each drawer in the first drawer column; and
(ii) a first locking part, shaped and configured for co-operating with said first latching part, the first locking part comprising a first locking bar coupled to a first motor arranged for raising and lowering the first locking bar;
and wherein the second locking mechanism responsible for releasing the selected drawer comprises:
(iii) a second latching part comprising a longitudinally arranged series of formations, wherein each formation is respectively provided on a side of each drawer in the first drawer column; and
(iv) a second locking part shaped and configured for co-operating with said second latching part, the second locking part comprising a second locking bar coupled to a second motor arranged for raising and lowering the second locking bar;

the first locking part being moveable such that in dependence upon a position of the first locking part relative to the first latching part a drawer selected for release may be withdrawn out of the cabinet only to the pre-determined extent; and the second locking part being moveable such that in dependence upon a position of the second locking part relative to a position of the second latching part, a drawer from said first drawer column may be released for withdrawal from the cabinet to the predetermined extent.

2. The controlled access dispensing system according to claim 1 wherein said locking arrangement is housed entirely internally within the cabinet and is thereby shielded from external interference.

3. The controlled access dispensing system according to claim 1 wherein the first locking bar comprises a sequence of longitudinally arranged projections and the second locking bar comprises a sequence of longitudinally arranged notches.

4. The controlled access dispensing system according to claim 3, wherein the formations of the longitudinally arranged series of formations of the second latching part are each projections, detents or pins and the second locking bar is moveable to align a projection, pin or detent such that it can pass through a notch of said sequence of notches in the second locking bar to release a drawer.

5. The controlled access dispensing system according to claim 1, wherein the formations of the laterally arranged sequences of formations of the first latching part provided on the side of each drawer comprise projections, detents, pins, step risers or protruding abutments.

6. The controlled access dispensing system according to claim 1, wherein the formations of the laterally arranged sequences of formations provided on the side of each drawer in the drawer column are arranged in an inclined manner.

7. The controlled access dispensing system according to claim 1 wherein each drawer comprises two or more compartments and wherein the number of formations in each sequence correlates to the number of compartments per drawer and wherein the formations in each sequence are positioned in correspondence with the compartments.

8. The controlled access dispensing system according to claim 1 wherein the second locking bar is disposed in front of the first locking bar, and wherein the second locking bar has a series of notches formed therein, the notches in the series being spaced such that incremental or step-wise adjustment of the position of the second locking bar releases one drawer singly and sequentially on each increment.

9. The controlled access dispensing system according to claim 1 wherein the first locking bar is accommodated within a first guide channel disposed internally of and formed within the cabinet and wherein the second locking bar is accommodated within a second guide channel disposed internally of and formed within the cabinet.

10. The controlled access dispensing system according to claim 9 wherein the first and second locking bars and said first and second guide channels are parallel to one another.

11. The controlled access dispensing system according to claim 1 wherein the second and first locking bars are individually moveable in a vertical plane and are engageable with an array of detent pins located on the side of each drawer, such that movement of the second locking bar will release one selected drawer for withdrawal and will prevent withdrawal of any other drawers in said drawer column and movement of the first locking bar before said second locking bar determines the extent to which withdrawal of that released drawer is permitted before the drawer is released for withdrawal by movement of said second locking bar.

12. The controlled access dispensing system according to claim 1 wherein the first locking bar is a rear locking bar and has a series of dogs on the profile of its inner edge that engage with a sequence of detent pins on the side of the drawer such that incremental vertical movement of the first locking bar positions said dogs such that they engage with the said detent pins at different positions, and such that these positions effect control of the distance of withdrawal of the drawer from its cabinet.

13. The controlled access dispensing system according to claim 12 wherein a multiplicity of detent pins are located within the drawer side, pitched laterally in increments corresponding to each drawer's internal compartment, and in ascending pitches vertically in increments corresponding to each incremental or step-wise movement of the first locking bar.

* * * * *